United States Patent
McDonnell et al.

(10) Patent No.: US 11,080,202 B2
(45) Date of Patent: Aug. 3, 2021

(54) LAZY INCREMENT FOR HIGH FREQUENCY COUNTERS

(71) Applicant: Intel Corporation, Santa Clara, CA (US)

(72) Inventors: Niall D. McDonnell, Limerick (IE); Christopher MacNamara, Limerick (IE); John J. Browne, Limerick (IE); Andrew Cunningham, Ennis (IE); Brendan Ryan, Limerick (IE); Patrick Fleming, Laois (IE); Namakkal N. Venkatesan, Portland, OR (US); Bruce Richardson, Shannon (IE); Tomasz Kantecki, Ennis (IE); Sean Harte, Limerick (IE); Pierre Laurent, Quin (IE)

(73) Assignee: Intel Corporation, Santa Clara, CA (US)

( * ) Notice: Subject to any disclaimer, the term of this patent is extended or adjusted under 35 U.S.C. 154(b) by 793 days.

(21) Appl. No.: 15/721,800

(22) Filed: Sep. 30, 2017

(65) Prior Publication Data

US 2019/0102312 A1 Apr. 4, 2019

(51) Int. Cl.
| | |
|---|---|
| *G06F 12/08* | (2016.01) |
| *G06F 12/0888* | (2016.01) |
| *G06F 12/0806* | (2016.01) |
| *G06F 12/0817* | (2016.01) |
| *G06F 12/0837* | (2016.01) |
| *G06F 9/00* | (2006.01) |

(52) U.S. Cl.
CPC ............ *G06F 12/0888* (2013.01); *G06F 9/00* (2013.01); *G06F 12/0806* (2013.01); *G06F 12/0828* (2013.01); *G06F 12/0837* (2013.01); *G06F 2212/6046* (2013.01); *G06F 2212/621* (2013.01)

(58) Field of Classification Search
CPC ............ G06F 12/0888; G06F 12/0806; G06F 12/0828; G06F 12/0837; G06F 2212/6046; G06F 2212/621
See application file for complete search history.

(56) References Cited

U.S. PATENT DOCUMENTS

| | | | | |
|---|---|---|---|---|
| 5,454,093 A | * | 9/1995 | Abdulhafiz | G06F 12/0859 365/189.05 |
| 6,073,210 A | * | 6/2000 | Palanca | G06F 12/0802 711/118 |
| 6,651,151 B2 | * | 11/2003 | Palanca | G06F 9/30047 711/158 |
| 2006/0150010 A1 | * | 7/2006 | Stiffler | G06F 11/1438 714/13 |
| 2013/0091331 A1 | * | 4/2013 | Moraru | G06F 12/126 711/143 |

(Continued)

OTHER PUBLICATIONS

L. Ecco and R. Ernst, "Improved DRAM Timing Bounds for Real-Time DRAM Controllers with Read/Write Bundling," 2015 IEEE Real-Time Systems Symposium, San Antonio, TX, 2015, pp. 53-64, doi: 10.1109/RTSS.2015.13. (Year: 2015).*

*Primary Examiner* — Khoa D Doan
(74) *Attorney, Agent, or Firm* — Patent Capital Group

(57) ABSTRACT

A computing apparatus, including: a processor; a pointer to a counter memory location; and a lazy increment counter engine to: receive a stimulus to update the counter; and lazy increment the counter including issuing a weakly-ordered increment directive to the pointer.

25 Claims, 10 Drawing Sheets

(56) References Cited

U.S. PATENT DOCUMENTS

2013/0166882 A1* 6/2013 Choquette ............. G06F 9/3851
                                                                           712/206
2016/0275026 A1* 9/2016 McDonnell ......... G06F 13/1673

* cited by examiner

LAZY INCREMENT FOR HIGH FREQUENCY COUNTERS

FIELD OF THE SPECIFICATION

This disclosure relates in general to the field of data center computing, and more particularly, though not exclusively to, a system and method for lazy increments for high frequency counters.

BACKGROUND

Contemporary computing practice has moved away from hardware-specific computing and toward "the network is the device." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
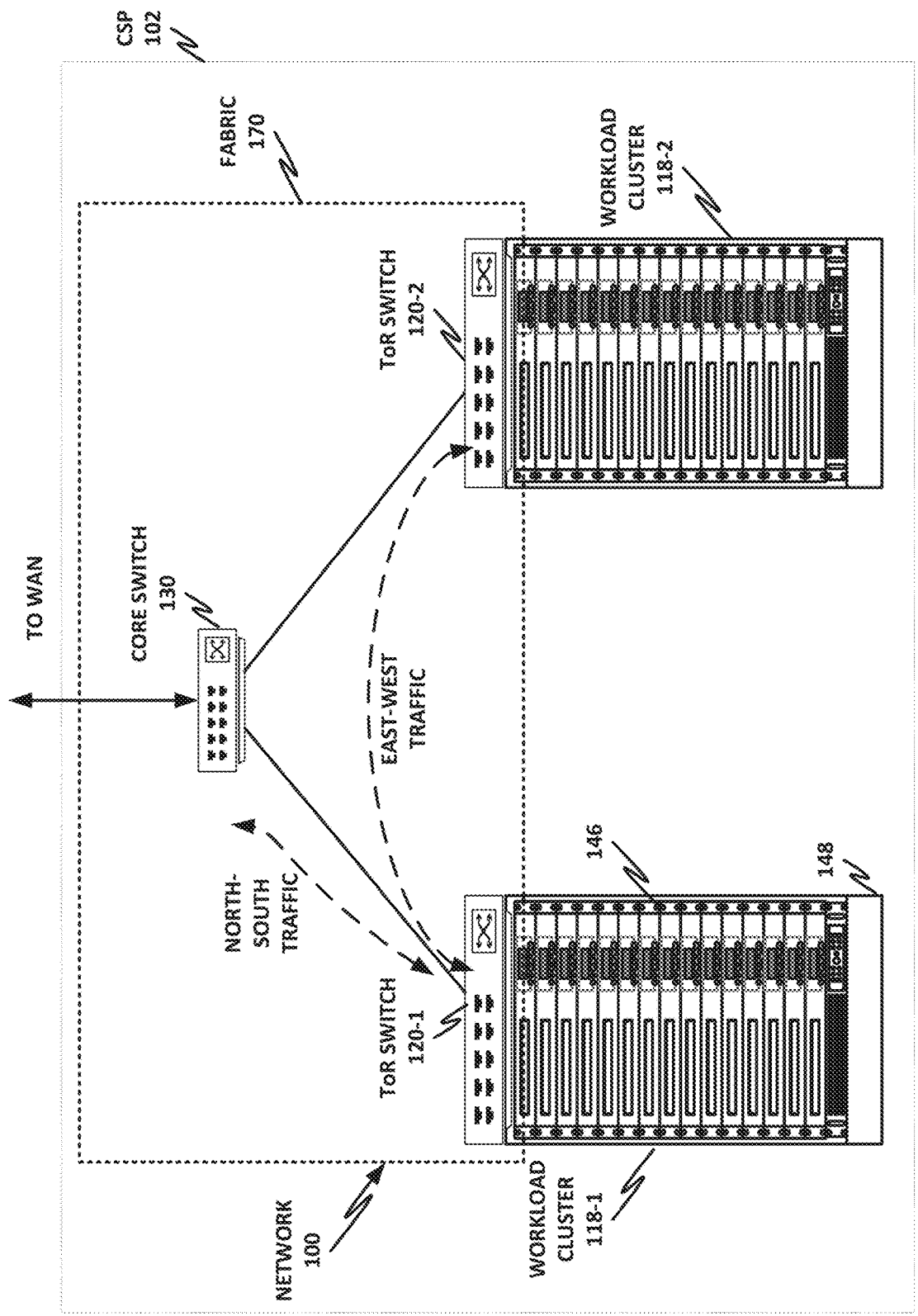
FIG. 1 is a network-level diagram of a cloud service provider (CSP), according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Modern data centers have become highly complex entities in which it is not feasible to simply provide a "best effort" for handling all traffic. Rather, in a modern data center, traffic may be classified according to complex algorithms and shaped according to factors such as service level agreements (SLAs) and quality of service (QoS) metrics.

A feature of such traffic shaping is high frequency counters. For example, an SLA may guarantee a certain amount of throughput on a fabric interface, a certain number of database transactions per time, or a certain number of processor cycles. To meet these SLAs and to shape traffic in the data center, a counter is provided that keeps a tally of each transaction so that resource allocations can be increased or throttled according to the needs of the data center. Note that the term "transaction" here is intended broadly. Transactions may be counted, for example, on a per-packet, per-user, or per-device basis as appropriate to the embodiment.

One challenge with such high frequency counters is that the counter itself can consume significant compute resources. Because the counter is tallying a large number of transactions taking place at very high data rates, a counter that consumes significant resources and that provides blocking access to memory locations can itself become a bottleneck in the data center.

Embodiments of the present specification provide increased packet throughput and decreased packet latency by reducing the cost of maintaining a large number of high-frequency counters in applications such as telecommunications and network function virtualization (NFV). In these types of applications, billing counters, QoS counters, SLA counters, and other statistics are a nontrivial issue. For example, a rate limiter may be used to shape traffic in a quality of service scheme, and maintain a large number of counters as part of a token bucket credit scheme. Embodiments of the present specification also lend themselves to shared bandwidth allocation, wherein excess bandwidth from the token buckets can be accumulated in a single counter accessible by all users.

To keep up with such high-frequency counters, embodiments of the present specification provide a counter device, which in some embodiments may be provided in hardware, such as by an ASIC or an FPGA. The counter device may have its own memory buffer in which one or more counters are stored. The counter buffers may be mapped to system memory addresses so that they can be pointed to by pointers according to ordinary software methods. In some embodiments, the counter device may be provided on-die, and may be tightly integrated with the cores. In other examples, the counter device may be an uncore device, such as one that interconnects with the cores via a local bus such as a PCIe bus. In yet other examples, the counter device may be part of a composite node in a software defined infrastructure (SDI) architecture, in which a dedicated resource may be provided such as on a compute sled, and the resource may be accessed by the cores via a high-speed fabric such as Intel® Omni-Path™.

In embodiments of the specification, cores may update the buffer by writing to the memory location with a cache bypass lazy increment. The term "cache bypass" here refers to an operation that bypasses the cache, and instead writes directly to the location. For example, a lazy increment may include a write combining (WC) directive via a write combining buffer (WCB). In this case, the core may issue a directive that writes directly to the WCB, and may then proceed to other tasks without waiting for a response. This means that the write to cache can be completed in one or a very few processor cycles. Other embodiments may use cache bypass mechanisms such as uncacheable (UC) writes. An advantage of using writeback cache bypass writing for a lazy increment is that there is no need to provide coherency between the various levels of cache for the various processors. Indeed, a feature of the lazy increment is that each core can increment the counter independently without coordination with the other cores such as by a read for ownership (RFO) operation.

Compared to incrementing counters, reading out the value of a counter is relatively less frequent. Reading out from a counter may be used by a rate limiter, for example, that needs to determine whether a particular process is receiving too much or too little bandwidth. Thus, while a read of the counter may take significantly more cycles in certain embodiments, the performance impact is relatively limited because such reads are relatively rare.

Note that in reading from a counter, there may be some number of "in-flight" increments that have been issued but have not yet reached the buffer. Thus, reading from the counter may be considered a "fuzzy" operation in the sense that the count need not be absolutely exact. The nature of these counters is such that a certain margin of imprecision is acceptable.

Embodiments may also be provided for use cases that involve multiple software threads sharing a variable and accessing it atomically. For example, in packet processing, statistics may be gathered. This may involve maintaining packet and/or byte counts for certain criteria, and could also include successfully processed packets for counting errors in the system. Examples of such operations include interface statistics and flow statistics for routers, gateways, and switches, where counters may be required to manage the appliances and may be exposed by net flow, Internet protocol flow information export (IPFIX) and sampled flow (sFlow) interfaces. The counters may be maintained by multiple cores and may be incremented for each type of traffic being monitored. Updates may be frequent based on the data rate and aggregated for reporting purposes periodically. As in the examples above, the cores updating the counters do not require the current value and only need to modify the value. Thus, as above, it may be very infrequent for the counter to need to read and use the data, and in fact may never be necessary as long as the data remains within certain bounds.

In certain embodiments, atomic instructions may be required to safely update a counter in a direct manner. The cycle cost of atomic access has driven some workarounds such as keeping local copies of the variable on each core and periodically aggregating. However, this can be complex and impractical if the total number of variables is large, which it frequently is. Some state-of-the-art NFV devices maintain statistics per flow in the millions, and each flow has its own counters.

Shared access to a memory-mapped I/O (MMIO) space may allow a device to decode inbound writes and perform the resulting operations atomically. Furthermore, weakly-ordered Intel architecture instructions such as MOVDIRI and MOVDIR64B, which are novel instructions, provide for an efficient cycle. However, in the case of statistic gathering, the number of variables may be very large and impractical to store in a device.

In some embodiments, one option may be to cache these variables from DRAM. Another option includes remote atomics (RAO), which provides updates via posted writes of shared variables in logical link control (LLC). Some embodiments of RAO cannot guarantee interrupt triggers based on the value of the variable.

In this specification, there are provided embodiments that are used to maintain and update a large number of shared variables, thus minimizing the cycle cost to update the variable, reducing the processor overhead for tracking large numbers of variables or counters. This also provides interrupts to be automatically generated on thresholds. In network function applications, this may simplify the error thresholding process.

In an embodiment, a large variable set may be stored in system memory. A device may cache a subset internally. As a result, there may be some coordination of temporal and spatial locality of accesses. By way of example, each shared variable may be considered to be 8 bytes, or 64 bits, in size, and thus naturally aligned in the address map. The use of weakly-ordered instructions to access the device may be assumed to minimize the cycle cost. This allows the system to gather statistics in an efficient fashion and handle excursions rapidly, thus enabling better telemetry in applications and network functions, and improving service assurance.

A system and method for lazy increments for high frequency counters will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a network 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating and consuming its own traffic.

To accommodate the large volume of a traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include a fabric interface, such as an Intel® Host Fabric Interface™ (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® Omni-Path™, TrueScale™, Ultra Path Interconnect™ (UPI) (formerly called QPI or KTI), STL, FibreChannel, Ethernet, FibreChannel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as Omni-Path™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
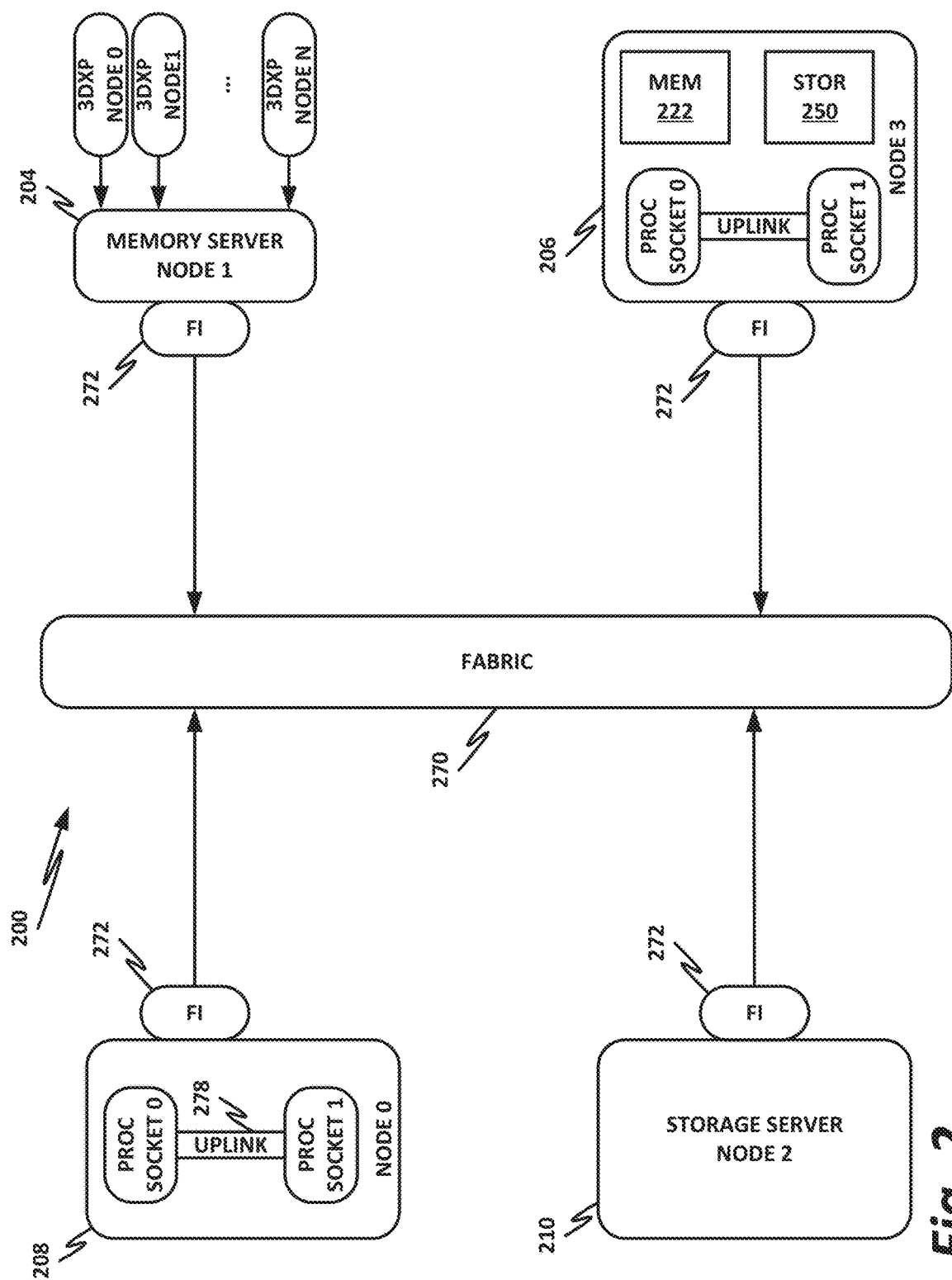
FIG. 2 is a block diagram of a data center according to one or more examples of the present specification.

FIG. 2 is a block diagram of a data center 200 according to one or more examples of the present specification. Data center 200 may be, in various embodiments, the same data center as Data Center 100 of FIG. 1, or may be a different data center. Additional views are provided in FIG. 2 to illustrate different aspects of data center 200.

In this example, a fabric 270 is provided to interconnect various aspects of data center 200. Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, data center 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via a fabric interface 272. Fabric interface 272 may be any appropriate fabric interface as described above, and in this particular illustrative example, may be an Intel® Host Fabric Interface™ for connecting to an Intel® Omni-Path™ fabric. In some examples, communication with fabric 270 may be tunneled, such as by providing UPI tunneling over Omni-Path™.

Because data center 200 may provide many functions in a distributed fashion that in previous generations were provided onboard, a highly capable fabric interface 272 may be provided. Fabric interface 272 may operate at speeds of multiple gigabits per second, and in some cases may be tightly coupled with node 0 208. For example, in some embodiments, the logic for fabric interface 272 is integrated directly with the processors on a system-on-a-chip. This provides very high speed communication between fabric interface 272 and the processor sockets, without the need for intermediary bus devices, which may introduce additional latency into the fabric. However, this is not to imply that embodiments where fabric interface 272 is provided over a traditional bus are to be excluded. Rather, it is expressly anticipated that in some examples, fabric interface 272 may be provided on a bus, such as a PCIe bus, which is a serialized version of PCI that provides higher speeds than traditional PCI. Throughout data center 200, various nodes may provide different types of fabric interfaces 272, such as onboard fabric interfaces and plug-in fabric interfaces. It should also be noted that certain blocks in a system on a chip may be provided as intellectual property (IP) blocks that can be "dropped" into an integrated circuit as a modular unit. Thus, fabric interface 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a fabric interface 272, which provides fast communication that makes these technologies possible.

By way of further illustration, node 3 206 is also depicted. Node 3 206 also includes a fabric interface 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
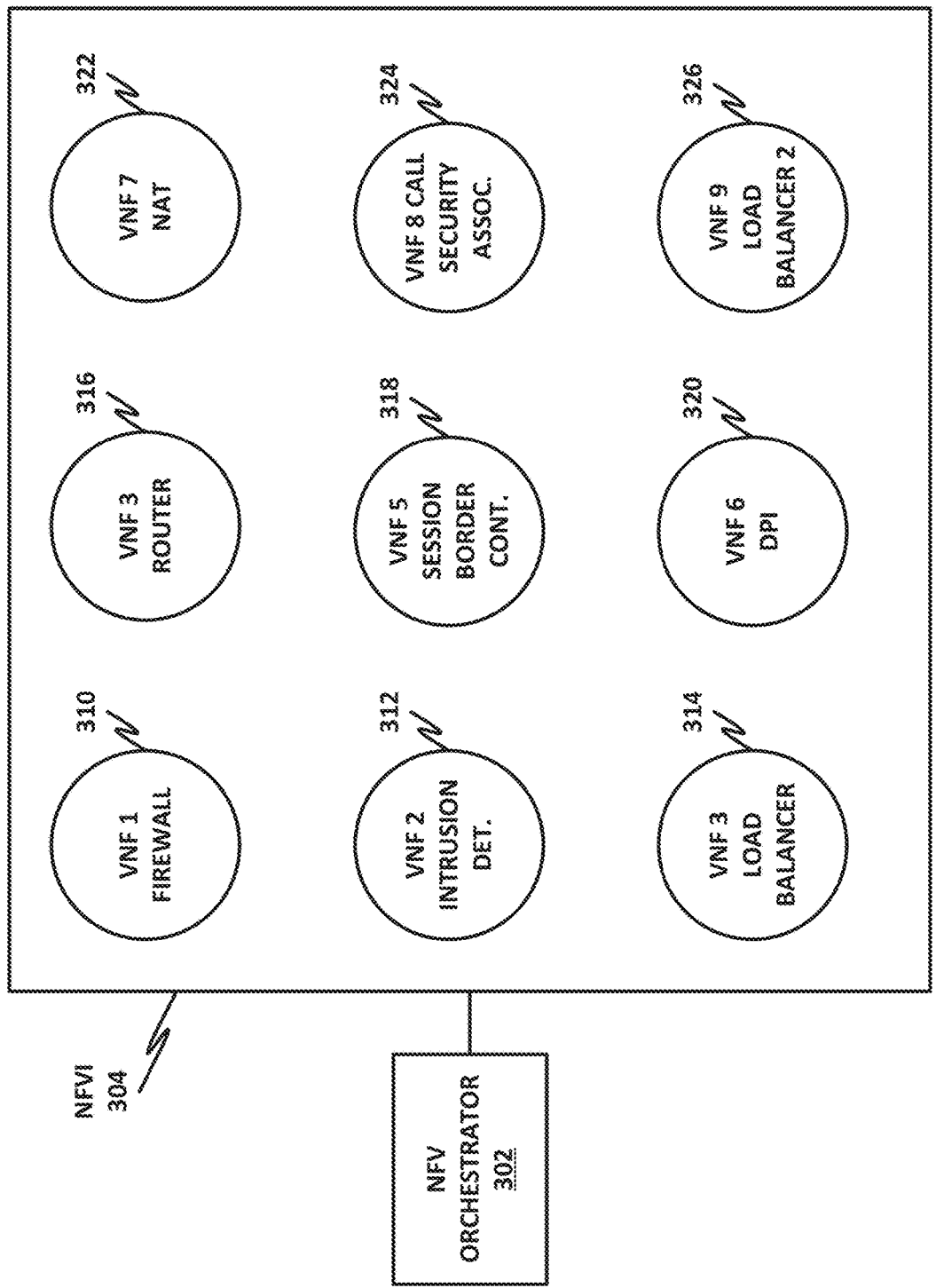
FIG. 3 is a block diagram of a network function virtualization (NFV) architecture according to one or more examples of the present specification.

FIG. 3 is a block diagram of a network function virtualization (NFV) architecture according to one or more examples of the present specification. NFV is a second nonlimiting flavor of network virtualization, often treated as an add-on or improvement to SDN, but sometimes treated as a separate entity. NFV was originally envisioned as a method for providing reduced capital expenditure (Capex) and operating expenses (Opex) for telecommunication services. One important feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI). Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

The illustrations of this in FIG. 3 may be considered more functional, compared to more high-level, logical network layouts. Like SDN, NFV is a subset of network virtualization. In other words, certain portions of the network may rely on SDN, while other portions (or the same portions) may rely on NFV.

In the example of FIG. 3, an NFV orchestrator 302 manages a number of the VNFs running on an NFVI 304. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus the need for NFV orchestrator 302.

Note that NFV orchestrator 302 itself is usually virtualized (rather than a special-purpose hardware appliance). NFV orchestrator 302 may be integrated within an existing SDN system, wherein an operations support system (OSS) manages the SDN. This may interact with cloud resource management systems (e.g., OpenStack) to provide NFV orchestration. An NFVI 304 may include the hardware, software, and other infrastructure to enable VNFs to run. This may include a rack or several racks of blade or slot servers (including, e.g., processors, memory, and storage), one or more data centers, other hardware resources distributed across one or more geographic locations, hardware switches, or network interfaces. An NFVI 304 may also include the software architecture that enables hypervisors to run and be managed by NFV orchestrator 302. Running on NFVI 304 are a number of virtual machines, each of which in this example is a VNF providing a virtual service appliance. These include, as nonlimiting and illustrative examples, VNF 1 310, which is a firewall, VNF 2 312, which is an intrusion detection system, VNF 3 314, which is a load balancer, VNF 4 316, which is a router, VNF 5 318, which is a session border controller, VNF 6 320, which is a deep packet inspection (DPI) service, VNF 7 322, which is a network address translation (NAT) module, VNF 8 324, which provides call security association, and VNF 9 326, which is a second load balancer spun up to meet increased demand.

Firewall 310 is a security appliance that monitors and controls the traffic (both incoming and outgoing), based on matching traffic to a list of "firewall rules." Firewall 310 may be a barrier between a relatively trusted (e.g., internal) network, and a relatively untrusted network (e.g., the Internet). Once traffic has passed inspection by firewall 310, it may be forwarded to other parts of the network.

Intrusion detection 312 monitors the network for malicious activity or policy violations. Incidents may be reported to a security administrator, or collected and analyzed by a security information and event management (SIEM) system. In some cases, intrusion detection 312 may also include antivirus or antimalware scanners.

Load balancers 314 and 326 may farm traffic out to a group of substantially identical workload servers to distribute the work in a fair fashion. In one example, a load balancer provisions a number of traffic "buckets," and assigns each bucket to a workload server. Incoming traffic is assigned to a bucket based on a factor, such as a hash of the source IP address. Because the hashes are assumed to be fairly evenly distributed, each workload server receives a reasonable amount of traffic.

Router 316 forwards packets between networks or subnetworks. For example, router 316 may include one or more ingress interfaces, and a plurality of egress interfaces, with each egress interface being associated with a resource, subnetwork, virtual private network, or other division. When traffic comes in on an ingress interface, router 316 determines what destination it should go to, and routes the packet to the appropriate egress interface.

Session border controller 318 controls voice over IP (VoIP) signaling, as well as the media streams to set up, conduct, and terminate calls. In this context, "session" refers to a communication event (e.g., a "call"). "Border" refers to a demarcation between two different parts of a network (similar to a firewall).

DPI appliance 320 provides deep packet inspection, including examining not only the header, but also the content of a packet to search for potentially unwanted content (PUC), such as protocol non-compliance, malware, viruses, spam, or intrusions.

NAT module 322 provides network address translation services to remap one IP address space into another (e.g., mapping addresses within a private subnetwork onto the larger internet).

Call security association 324 creates a security association for a call or other session (see session border controller 318 above). Maintaining this security association may be critical, as the call may be dropped if the security association is broken.

The illustration of FIG. 3 shows that a number of VNFs have been provisioned and exist within NFVI 304. This figure does not necessarily illustrate any relationship between the VNFs and the larger network.

Figure 4:
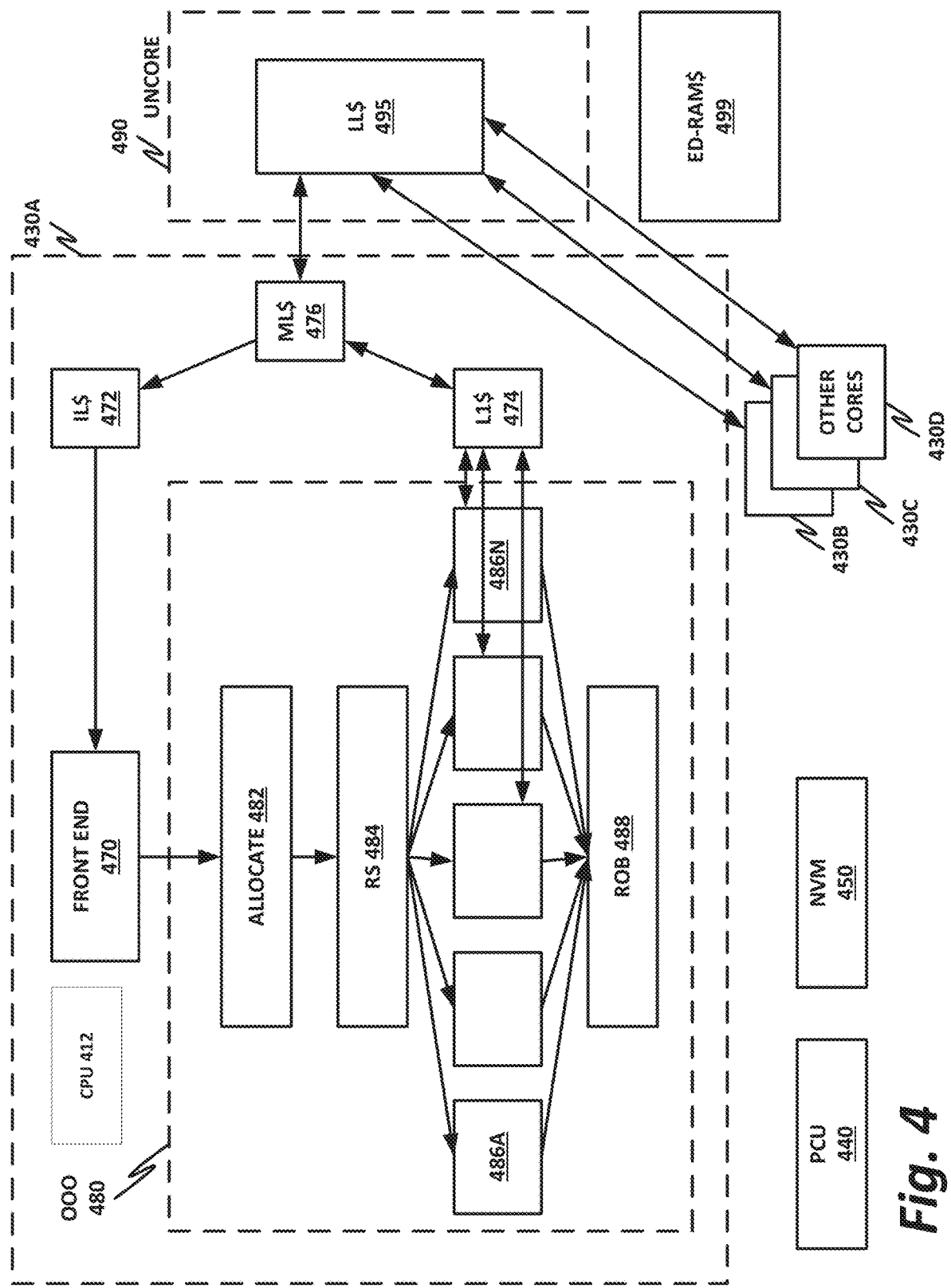
FIG. 4 is a block diagram of a central processing unit (CPU) according to one or more examples of the present specification.

FIG. 4 illustrates a block diagram of a central processing unit (CPU) 412 in accordance with certain embodiments. Although CPU 412 depicts a particular configuration, the cores and other components of CPU 412 may be arranged in any suitable manner. CPU 412 may comprise any processor or processing device, such as a microprocessor, an embedded processor, a digital signal processor (DSP), a network processor, an application processor, a co-processor, a system on a chip (SOC), or other device to execute code. CPU 412, in the depicted embodiment, includes four processing elements (cores 430 in the depicted embodiment), which may include asymmetric processing elements or symmetric processing elements. However, CPU 412 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 430A includes an out-of-order processor that has a front end unit 470 used to fetch incoming instructions, perform various processing (e.g. caching, decoding, branch predicting, etc.) and passing instructions/operations along to an out-of-order (OOO) engine. The OOO engine performs further processing on decoded instructions.

A front end 470 may include a decode module coupled to fetch logic to decode fetched elements. Fetch logic, in one embodiment, includes individual sequencers associated with thread slots of cores 430. Usually a core 430 is associated with a first ISA, which defines/specifies instructions executable on core 430. Often machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 430, in one embodiment, recognize the same ISA (or a subset thereof). Alternatively, in a heterogeneous core environment, a decoder of one or more cores (e.g., core 430B) may recognize a second ISA (either a subset of the first ISA or a distinct ISA).

In the embodiment depicted, the out-of-order engine includes an allocate unit 482 to receive decoded instructions, which may be in the form of one or more micro-instructions or uops, from front end unit 470, and allocate them to appropriate resources such as registers and so forth. Next, the instructions are provided to a reservation station 484, which reserves resources and schedules them for execution on one of a plurality of execution units 486A-486N. Various types of execution units may be present, including, for example, arithmetic logic units (ALUs), load and store units, vector processing units (VPUs), floating point execution units, among others. Results from these different execution units are provided to a reorder buffer (ROB) 488, which take unordered results and return them to correct program order.

In the embodiment depicted, both front end unit 470 and out-of-order engine 480 are coupled to different levels of a memory hierarchy. Specifically shown is an instruction level cache 472, that in turn couples to a mid-level cache 476, that in turn couples to a last level cache 495. In one embodiment, last level cache 495 is implemented in an on-chip (sometimes referred to as uncore) unit 490. Uncore 490 may communicate with system memory 499, which, in the illustrated embodiment, is implemented via embedded DRAM (eDRAM). The various execution units 686 within OOO engine 480 are in communication with a first level cache 474 that also is in communication with mid-level cache 476. Additional cores 430B-430D may couple to last level cache 495 as well.

In particular embodiments, uncore 490 may be in a voltage domain and/or a frequency domain that is separate from voltage domains and/or frequency domains of the cores. That is, uncore 490 may be powered by a supply voltage that is different from the supply voltages used to power the cores and/or may operate at a frequency that is different from the operating frequencies of the cores.

CPU 412 may also include a power control unit (PCU) 440. In various embodiments, PCU 440 may control the supply voltages and the operating frequencies applied to each of the cores (on a per-core basis) and to the uncore. PCU 440 may also instruct a core or uncore to enter an idle state (where no voltage and clock are supplied) when not performing a workload.

In various embodiments, PCU 440 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 440 may detect stress characteristics at any suitable interval.

In various embodiments, PCU 440 is a component that is discrete from the cores 430. In particular embodiments, PCU 440 runs at a clock frequency that is different from the clock frequencies used by cores 630. In some embodiments where the PCU is a microcontroller, PCU 440 executes instructions according to an ISA that is different from an ISA used by cores 430.

In various embodiments, CPU 412 may also include a nonvolatile memory 450 to store stress information (such as stress characteristics, incremental stress values, accumulated stress values, stress accumulation rates, or other stress information) associated with cores 430 or uncore 490, such that when power is lost, the stress information is maintained.

Figure 5:
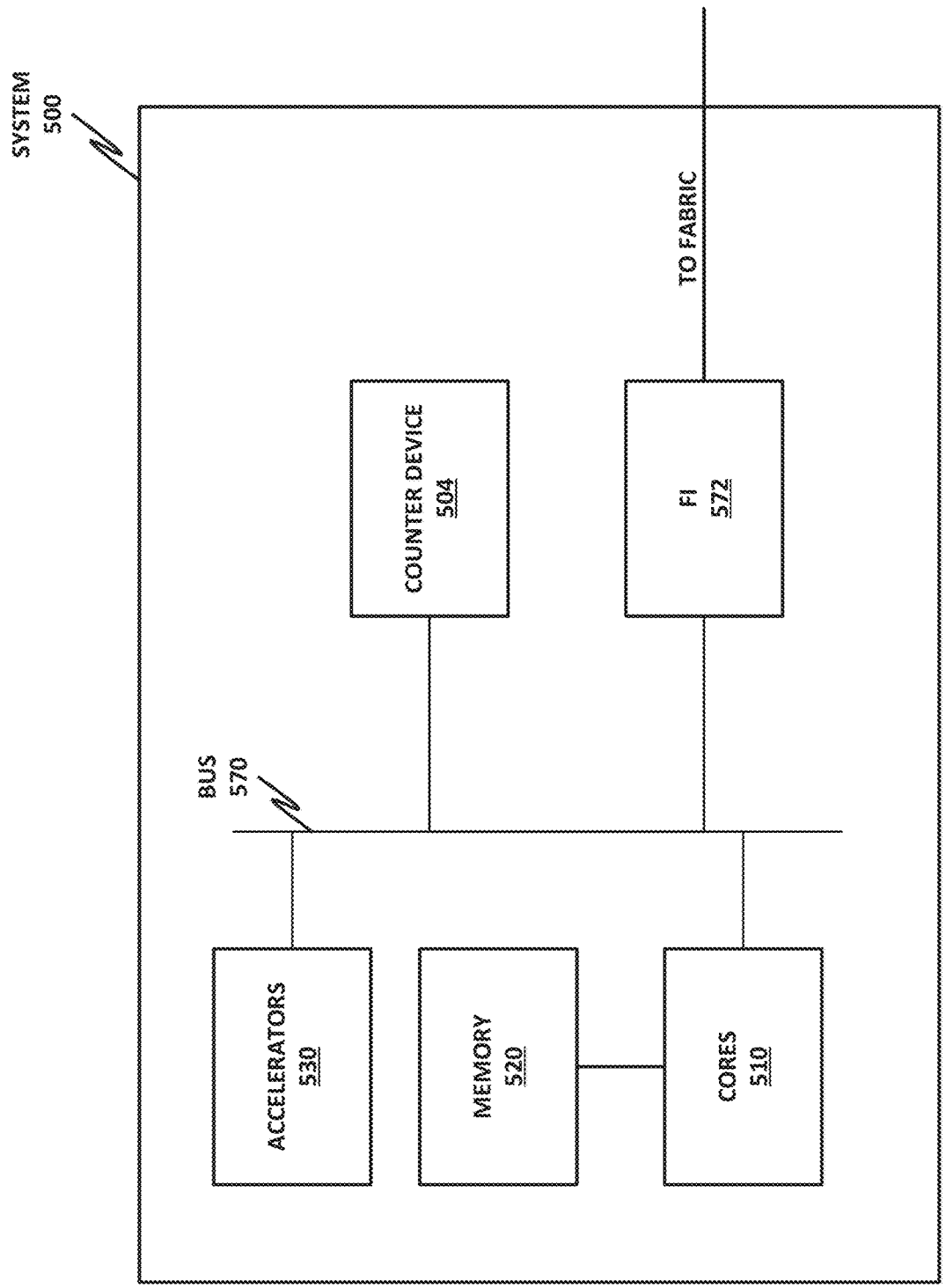
FIG. 5 is a block diagram of a system that employs counting methodologies according to one or more examples of the present specification.

FIG. 5 is a block diagram of a system 500 that employs counting methodologies according to one or more examples of the present specification. In the example of FIG. 5, system 500 includes a plurality of cores 510. As described above, cores 510 may be operating in a data center where it is necessary to keep a tally of high-volume operations such as packet flows and database transactions. Thus, cores 510 are communicatively coupled via a bus 570 to a counter device 504. Cores 510 may also be communicatively coupled to other elements such as a fabric interface 572, a memory 520 (which may be accessed via a DMA bus), and other data center resources such as accelerators 530, or other similar resources that enable system 500 to perform its intended task.

System 500 should be understood broadly to encompass many different types of architectures. For example, system 500 may be a single board computer, a system-on-a-chip, or a single rack, blade, or sled server. In these cases, bus 570 could either be a tightly coupled on-die interface, or other highly local interconnect. In other cases, bus 570 may be a standardized interface such as a PCIe bus. However, it should also be noted, that in modern data centers such as those that employ software defined infrastructure (SDI), bus 570 could provide a more distributed architecture. For example, according to SDI principles, a "composite node" may be defined in which one or more cores are provided independently, and other resources such as memory 520 and accelerators 530 and counter device 504 may be provided by dedicated device pools connected via a high-speed fabric such as an Intel® Omni-Path™ fabric. In the case of a composite node, an SDI controller may designate one or more cores and may also designate one or more distributed resources, may associate them via an interface such as fabric interface 572, and may then boot the composite node with these distributed resources. The very high speeds provided by contemporary fabrics make it possible for such devices to communicate at speeds that approach the speeds of traditional local interconnects. Thus, it is feasible to provide distributed resources on dedicated nodes with highly capable and reconfigurable resource allocations.

In this example, counter device 504 provides one or more counters as described in this specification. Counter device 504 may be, by way of nonlimiting example, an ASIC, an FPGA, a software engine, or some other combination of hardware and software to provide the counter functions. Counter device 502 may provide counters within its own onboard memory, or may allocate memory locations within memory 520.

In cases where counter device 504 provides its own onboard counter buffers, those counter buffers may be mapped to addresses accessible via a software memory space on cores 510. This enables software running on cores 510 to access those buffers similar to ordinary memory access operations.

Figure 6:
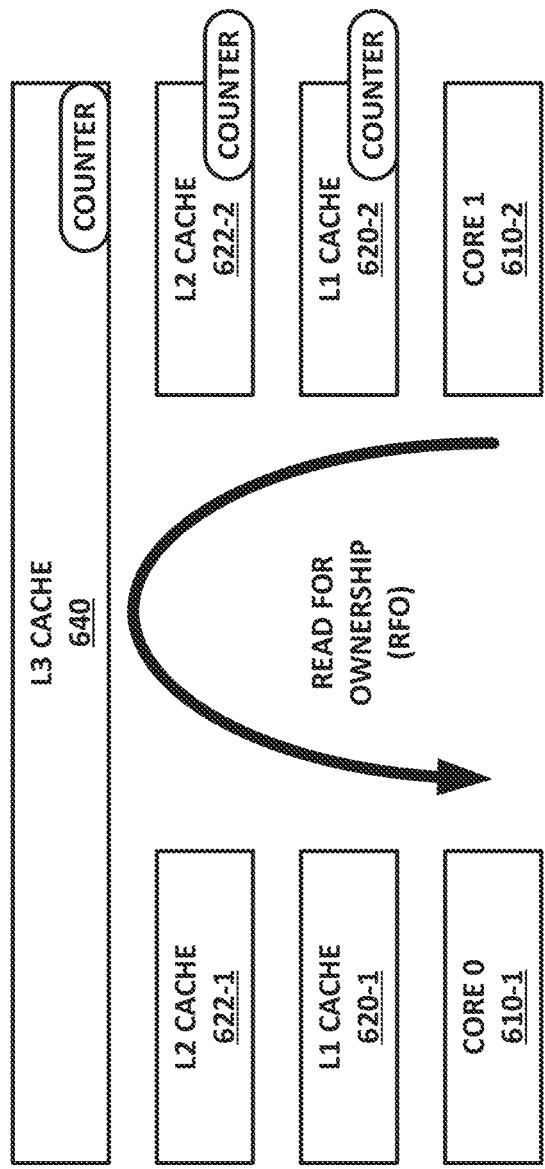
FIG. 6 is a block diagram illustrating cached counter increment operations according to one or more examples of the present specification.

FIG. 6 is a block diagram illustrating cached counter increment operations according to one or more examples of the present specification. In this example, both core 1 610-2 and core 0 610-1 need access to a counter such as to be able to increment the counter. In this case, core 0 has an L1 cache 620-1, and an L2 cache 622-1. Core 1 610-2 has an L1 cache 620-2 and an L2 cache 622-2. Core 0 610-1 and core 1 610-2 share an L3 cache 640.

When core 1 610-2 needs to update the counter, it may perform an ordinary memory write operation, which propagates via L1 cache 620-2 and L2 cache 622-2 to L3 cache 640. The counter may then be written out from L3 cache 640 to a map to memory address, such as an address within the actual memory, or a buffer within the counter device that is mapped to the memory address space.

In this approach, statistical counters may be kept in writeback memory and shared across the multiple CPU cores. Two cores are provided here for purposes of a simplified illustration, but in fact many more cores may be provided, such as 4, 8, or 16 cores.

In this example, the counter update operation includes three smaller operations: namely read, modify, and write. In other words, to update the counter, a core fetches the counter from memory, increments the counter, and then writes the modified value back to memory. As illustrated in FIG. 6, this sequence requires a read for ownership (RFO), which grants exclusive ownership of the counter to the requesting core.

For example, if core 0 610-1 issues an RFO, then core 0 upon reading the value gets ownership of the counter, and copies of the counter in L1 cache 620-2 and L2 cache 622-2 are invalidated. This ensures that core 0 has the most up-to-date copy of the counter, and that other cores cannot corrupt the value while the operation is in-flight.

After updating the counter, core 0 610-1 may write the updated value to L1 cache 620-1, which then propagates the value to L2 cache 622-1, and finally to L3 cache 640, where it is written out to memory. In certain embodiments, this read-modify-write sequence can take as many as 300 cycles. During those 300 cycles, none of the other cores may update the counter.

Figure 7:
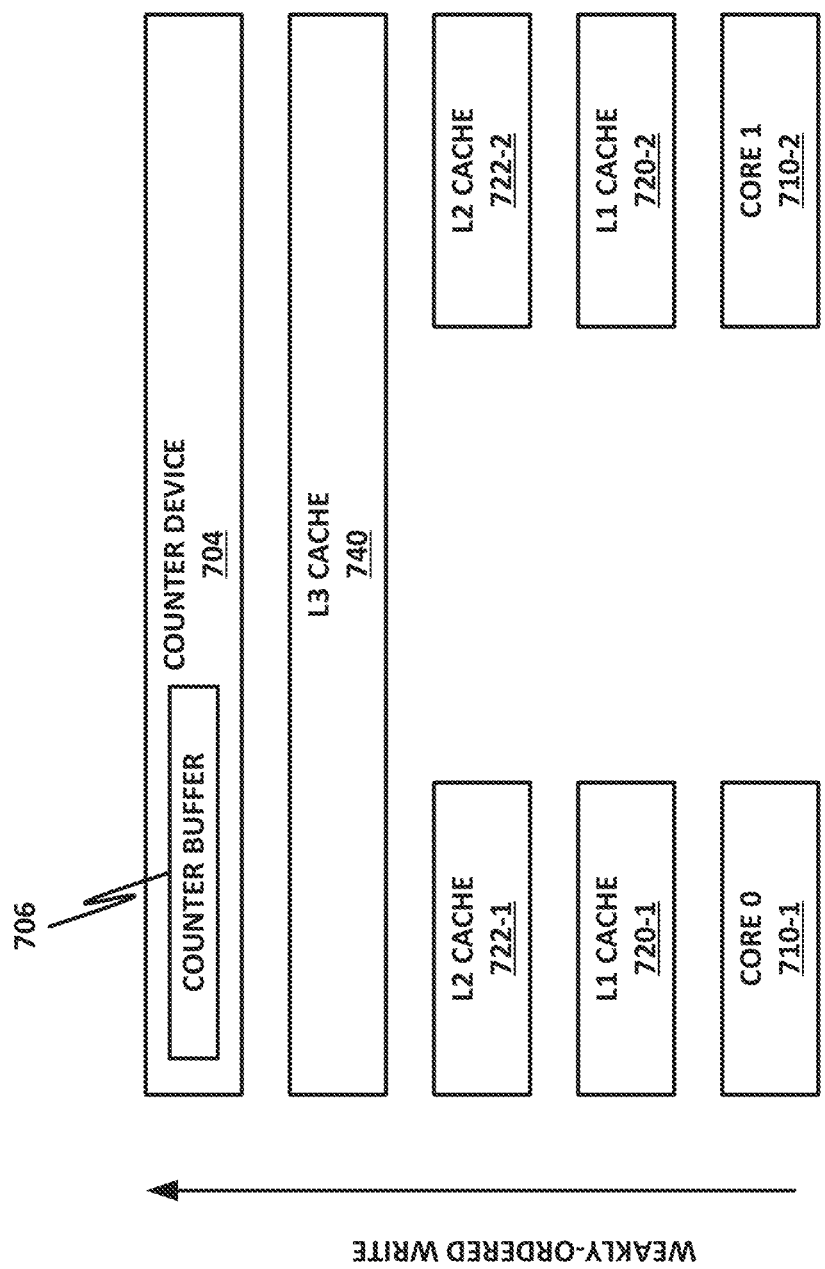
FIG. 7 is a block diagram of a system architecture in which a lazy increment may be used in place of a read-modify-write method according to one or more examples of the present specification.

FIG. 7 is a block diagram of a system architecture in which a lazy increment may be used in place of a read-modify-write method as described in the previous figure.

In the example of FIG. 7, once again two different cores need to modify a counter buffer 706. As before, core 0 710-1 is connected to L1 cache 720-1 and L2 cache 722-1. Core 1 710-2 is connected to L1 cache 720-2 and L2 cache 722-2. Both cores share L3 cache 740. Both cores also share a counter device 704, which may be a counter device such as counter device 504 of FIG. 5. In this example, counter device 704 includes its own dedicated counter buffer 706, which may include one or more counters as described herein. As described before, counter buffer 706 may be mapped to the memory address space of cores 710 so that software running on cores 710 can access counter buffer 706 as though it were traditional random access memory on the system.

In contrast to the embodiment of FIG. 6, in FIG. 7, when core 0 710-1 needs to update a counter in counter buffer 706, core 0 710-1 may issue a weakly ordered cache bypass write to counter buffer 706. This write operation targets counter buffer 706 on counter device 704, and counter device 704 interprets the write as a counter increment or decrement operation.

Advantageously, core 0 710-1 can issue the cache bypass write to counter buffer 706 without needing to maintain cache coherency with core 1 710-2.

The weakly ordered aspect of the write operation implies that there is no need to maintain strict ordering between core 0 710-1 and core 1 710-2. For example, if core 1 issues in increment that is driven by a transaction that occurred after an increment on core 0 710-1, a race condition could occur in which the increment from core 0 710-2 arrives at counter buffer 706 before the increment from core 0 710-1. However, the overall effect on counter buffer 706 and gross is negligible or nonexistent. Regardless of whether increments and decrements arrive at counter buffer 706 in the exact correct order, counter buffer 706 will still maintain a relatively accurate count.

Advantageously, the weakly ordered increment operation of the present specification provides significant increases of efficiency with respect to the embodiment of FIG. 6. In the example of FIG. 7, the weakly ordered write operation may consume only a single clock cycle in some embodiments, and up to 100 cycles in embodiments where fencing is required. Thus, the savings in processor cycles are on the order of between 300× and 3×.

For example, in one test scenario, 8.4 million transaction updates were performed per second on a 100 Gb fabric with 128 byte packets. One counter update was required for each packet. Note that in a real data center, this number could be significantly more, as multiple updates may be required for each packet to count, for example, data bandwidth transactions, database transactions, processor transactions, error conditions, and other resource usages.

In the test case, the counter was updated by multiple cores. Using the cache coherent method of FIG. 6, with 4.5 million transactions per second times 300 cycles per transaction, approximately 1.35 GHz of a core were consumed for counting the transactions.

In contrast, using the embodiment of FIG. 7, in a best-case scenario of weakly-ordered increments (no fencing, only one cycle per write), 4.5 MHz of the core were consumed. In a worst-case scenario with fencing, 100 cycles were consumed per cycle, thus consuming 450 MHz of the core. Thus, the savings in clock cycles was between 3 times and 300 times for the embodiment of FIG. 7.

Figure 8:
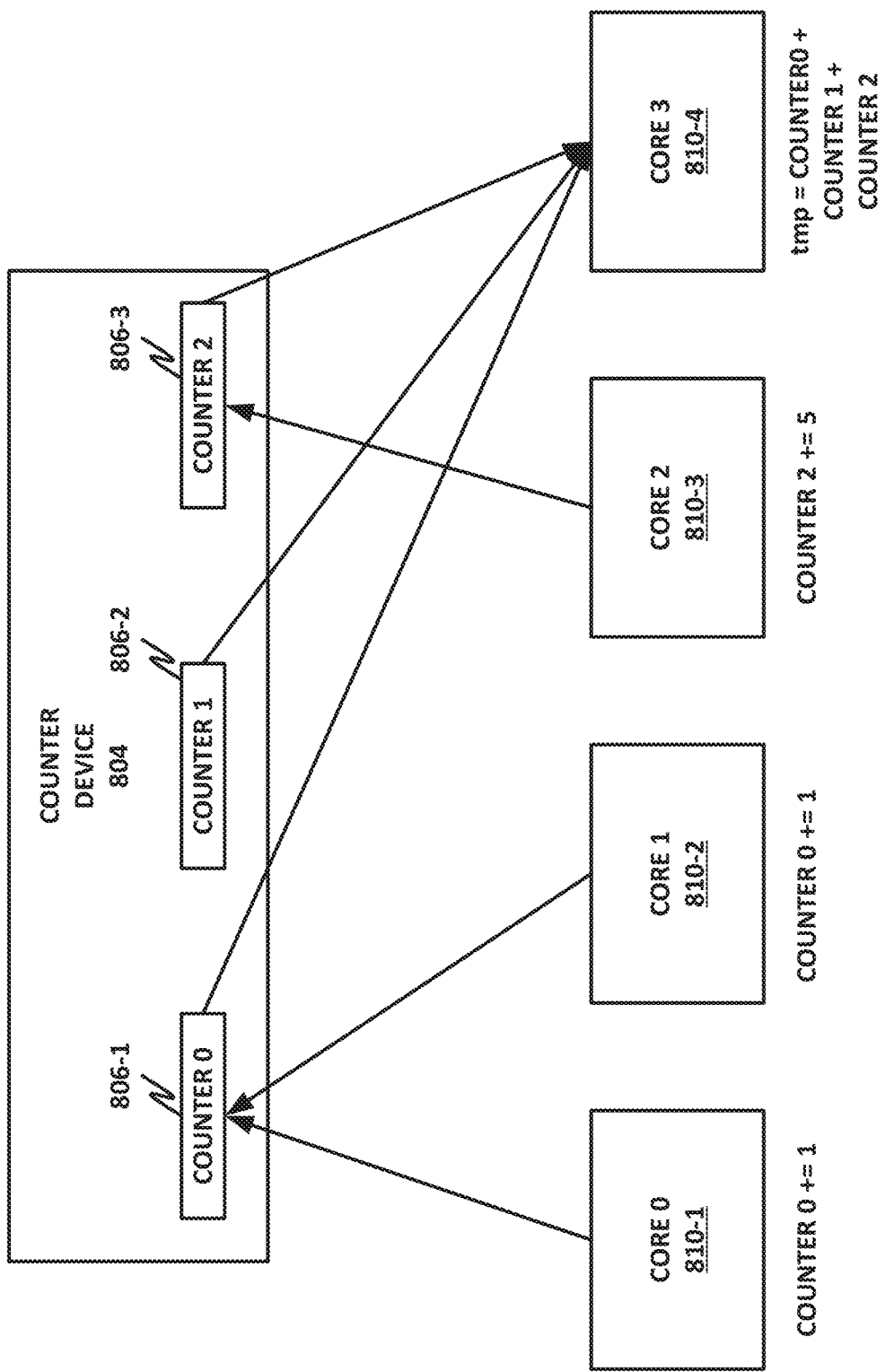
FIG. 8 is a block diagram of an embodiment wherein a counter device includes a plurality of counters according to one or more examples of the present specification.

FIG. 8 is a block diagram of an embodiment wherein a counter device 804 includes a plurality of counters 806 according to one or more examples of the present specification.

In this example, counter device 804 may be an uncore PCIe device that may be implemented in an FPGA or ASIC. However, it should be understood that counter device 804 in general terms may be embodied in any of the examples disclosed throughout this specification.

In this case, counter device 804 includes three counters, namely counter 0 806-1, counter 1 806-2, and counter 2 806-3. These three counters are accessed by four different cores, namely core 0 810-1, core 1 810-2, core 2 810-3, and core 3 810-4.

In this example, counters 806 are mapped to the memory address space of cores 810, but are not provided in the main memory or RAM of the system. However, because counters 806 are mapped to the memory address space of cores 810, software running on cores 810 may access counters 806 as though they were ordinary memory locations.

In this example, core 0 810-1 needs to increment counter 0 806-1. Core 1 810-2 also needs to increment counter 0 806-1 by one. Core 2 810-3 needs to increment counter 2 806-3 by five. Core 3 810-4 needs to read from counter 0 806-1, counter 1 806-2, and counter 2 806-3 to perform an operation such as rate limiting or similar.

In this example, core 0 810-1 issues a weakly ordered increment directive to counter 0 806-1. Core 1 810-2 also issues a weakly ordered increment directive to counter 0 806-1. Note that regardless of which actual, real-life operation occurred first, a race condition may occur between the weakly ordered write directives from core 0 802-1 and core 1 810-2. However, counter device 804 need not be concerned about which event occurred first in real life. Rather, counter 0 806-1 may include a queue, in which incoming increment and decrement operations are simply queued without regard for which corresponds to real-life order of transactions. Queued increment and decrement operations are used to increment and decrement counter 0 806-1 without strict ordering.

Although in this case core 2 810-3 is the only core currently writing to counter 2 806-3, core 2 810-3 may also issue a weakly ordered write directive to counter 2 806-3. In this case, the write directive increments counter 2 806-3 by a value of 5.

Core 3 810-4 reads out values from counter 0 806-1, counter 1 806-2, and counter 3 806-3. Core 3 may, by way of example, assign the sum of these three counters to a temporary memory location which may be used to perform rate limiting.

Counter device 804, in one example, may support memory mapped base address registers, which enables mapping of counters 806-1 to the memory space of cores 810. A wrapper or application programming interface running on cores 810 or similar macros may be used to write to and read from counters at the application level.

In this example, counters 806 are onboard memory buffers of counter device 804, although in other embodiments counters 806 may be embodied in system memory, last level cache, and CPU caches.

It should be noted that with this weakly ordered approach, the reads performed by core 3 are much more costly than the writes performed by core 0 810-1, core 1 810-2, and core 2 810-3. However, this may have minimal impact on overall system performance as counters 806 may generally be read from much less often than they are written to.

Note that in some embodiments, counters 806 are located in contiguous memory spaces. In cases where caching is used, a single cache line write may update up to eight different counters, assuming that each counter is 8 bytes or 64 bits. However, it is not always necessary to write to eight different counters at once. Thus, some of those memory bytes may be 0 padded in the cache line to ensure that the correct counter is written to.

Reads from and writes to counters 806 may be constrained to such 8-byte memory operations. A read returns the current value of the counter, without regard to whether there are any in-flight writes. Writes may be provided as a 64-bit write packet or payload, which may be split into an operation type and value fields.

Figure 9:
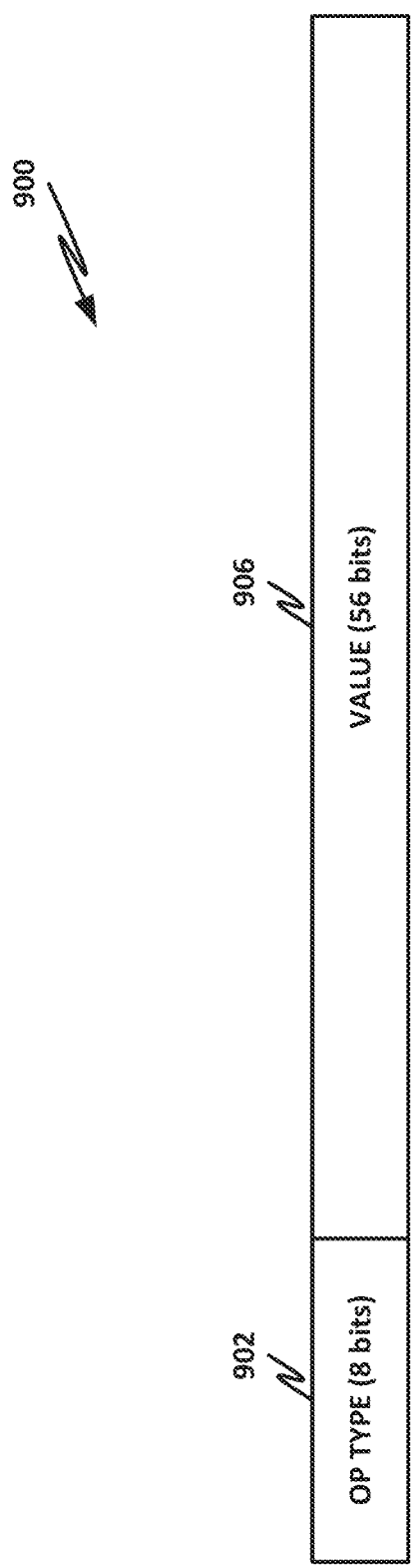
FIG. 9 is a block diagram of an example 64-bit write payload according to one or more examples of the present specification.

FIG. 9 is a block diagram of an example 64-bit write payload 900 according to one or more examples of the present specification.

In this example, write payload 900 includes an 8-bit operation type field 902, and a 56-bit value field 906.

Operation type field 902 may include a binary indicator for the type of operation to be performed. By way of nonlimiting example, the following operation types may be supported:

a. 0xff: Counter reset. In this case, value field 906 may include a value that the counter is to be reset to if it is a nonzero value.
b. 0x00: No operation.
c. 0x01: Increment by a value in field 906.
d. 0x02: Decrement by a value in field 906.

The foregoing operation types are provided by way of nonlimiting example only. Other operation types may be added for particular use cases. For example, an operation type may be provided to set or clear particular bits to change status bit fields in a counter so that they can be inexpensively updated in a multicore system.

Note that the use of 8 bits for operation type field 902 naturally decreases the available size of value field 906, limiting it to 56 bits.

By way of example, several software interaction models are provided, a novel move (MOV) instruction with a "fast doorbell" feature is provided. This instruction performs a write operation to a specified address, and overrides the memory type indicated by the target address with a WC memory type (weakly ordered). Stored data are buffered in the WCB, and the instruction triggers an immediate eviction of the WCB. Thus, the core is not stalled while waiting for WCB eviction to complete. It can continue operating other instructions.

In another example, store fencing (SFENCE) may be used. SFENCE performs a serializing operation on all store-to-memory instructions that were issued before the SFENCE instruction. This serializing operation guarantees that every store instruction that precedes the SFENCE instruction in program order becomes globally visible before any store instruction that follows the SFENCE instruction. The SFENCE instruction is ordered with respect to store instructions, other SFENCE instructions, other fencing instructions, and any serializing instructions (such as the CPUID instruction). It is not ordered with respect to load instructions. Weakly ordered memory types can be used to achieve higher processor performance through such techniques as out-of-order issue, write-combining, and write-collapsing.

In the case of fencing, the counter memory page may be mapped as the WC. The write may be an 8-byte MOV operation. To avoid hitting a WCB that has not been evicted yet, the software may either have a write all cache line (zero other counter fields), or may use SFENCE to make sure the WCB gets flushed.

In yet another example, a local WB counter and WC memory type may be used. This is similar to the previous example. The software keeps local counter updates in WB memory and issues aggregated counter updates (potentially multiple counters updated in one cache line). As counter updates are expected to happen less often, the SFENCE may be unnecessary (WCB may be flushed naturally between counter updates). If a guarantee is required, an SFENCE instruction may be issued. SFENCE may not be necessary in cases where all cache lines with counter updates get written.

Figure 10:
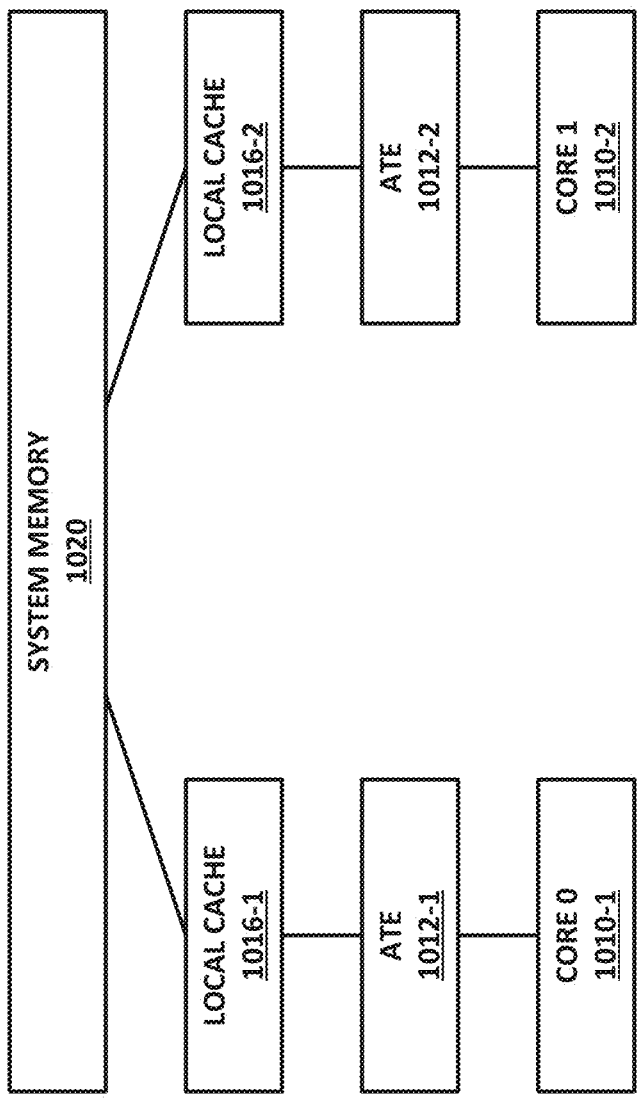
FIG. 10 is a block diagram of a two-tier lazy increment, according to one or more examples of the present specification.

It should also be noted that the lazy increment of the present specification may be further extended to offer other functions such as:

a. Auto-aggregating the number of counters, and providing the value via a specified counter.

b. Trigger interrupts (including in user space) for alarms.
   For example:
   i. Counter threshold alarms
   ii. Counter change alarms
c. Set and clear bit operations FIG. 10 is a block diagram of a two-tier lazy increment, according to one or more examples of the present specification. In the example of FIG. 10, as before, two different cores, namely core 0 1010-1 and core 1 1010-2 need to access a counter. In this case, the full counter data may be located in system memory 1020, while a subset of the data may be located in local cache 1016-1 and 1016-2, respectively. To ensure that data are recorded correctly, two address translation engines 1012-1 and 1012-2 are provided to translate addresses.

Each core 1010 may need to be aware of the address of a shared variable. This may be an MMIO address, or in some cases may be a system address, such as a virtual address (VA) or a physical memory address (PA).

In the case of an MMIO address, the value can be conveyed in the address used to access the device. For a system address, 8 bytes of data may be used. If the system memory address is other than a host physical address, the device may also need to derive address contextual information, such as a relative identifier (RID) or process address space identifier (PASID) to allow address translation. If the locations are not guaranteed resident in memory, a fault handling scheme may be provided, such as a data translation lookaside buffer (DTLB).

A command may be issued to operate on a counter, such as add, subtract, or increment. In one example, one byte of data is used, thus providing a maximum of 256 commands that could be conveyed in the address as one byte of data. Optionally, an argument may also be provided; for example, the argument may include two to four bytes of data space. Optionally, information may also be used to generate an interrupt, such as trigger conditions (for example, a wrap bit), and may be contained in two bytes of data. Finally, interrupt vector information may also be provided in two bytes of data.

If the total amount of data required is 16 bytes, this can be conveyed via a single instruction such as MOVDIR64B, or two MOVDIRI instructions. While this may incur some cycle cost associated with assembling the data, it is still lower than a comparable, strongly-ordered atomic operation on writeback memory. This is especially true if there is significant contention.

Upon receiving a write to the MMIO region, a core 1010 decodes the address, which may provide information such as:
   RID or PASID for translation and interrupt generation.
   The location of the variable (such as device cache or system memory).
   The command to execute.

Further action may depend on whether the shared variable is mapped into a device local cache 1016 or system memory 1020.

In the case where the address maps to local device memory, such as an internal cache 1016, it may be assumed that the cache is backed by a much larger range of system memory sequestered for the device by the driver. Shared variables may all be stored in this range.

The MMIO address may be checked against the cache. If it misses, the device may attempt to read the corresponding system address cache line to its internal storage. The address issued may be subject to address translation. In some cases, an existing line may need to be evicted.

The variable may be accessed and modified per the command. Any interrupt conditions indicated may be checked, and an interrupt may be generated if necessary.

On the other hand, if the shared variable is mapped to system memory, then the system address is checked against the cache. If it misses, the device will attempt to read the cache line into its internal storage. The address issued may be subject to address translation. As before, an existing line may need to be evicted.

The variable may be accessed and modified per the command. Any interrupt conditions indicated may be checked, and an interrupt may be generated as necessary.

The overall success of this scheme may depend in some embodiments on the degree of temporal and spatial locality in the access to the shared variables. For packet processing usages, a degree of temporal locality is often expected. Millions of flows may exist, but the number active in the system at a given time may be in the low thousands. The spatial locality aspect may also be met by grouping related statistics into a common cache line, for example packet and byte counts for a given flow.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

Note also that in certain embodiments, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In operation, a storage may store information in any suitable type of tangible, nontransitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms 'memory' and 'storage,' as appropriate. A nontransitory storage medium herein is expressly intended to include any nontransitory special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

The following examples are provided by way of illustration.

Example 1 includes a computing apparatus, comprising: a processor; a pointer to a counter memory location; and a lazy increment counter engine to: receive a stimulus to update the counter; and lazy increment the counter comprising issuing a weakly-ordered increment directive to the pointer.

Example 2 includes the computing apparatus of example 1, wherein the counter memory location is mapped to a counter buffer of a counter device.

Example 3 includes the computing apparatus of example 1, wherein the weakly-ordered increment directive is a cache bypass write directive.

Example 4 includes the computing apparatus of example 3, further comprising a write combining buffer (WCB).

Example 5 includes the computing apparatus of example 4, wherein the write directive is a write combining (WC) directive via the WCB.

Example 6 includes the computing apparatus of example 3, wherein the write directive is an uncacheable (UC) write.

Example 7 includes the computing apparatus of any of examples 1-6, wherein the write directive is to write a 64-bit counter payload to the counter memory location.

Example 8 includes the computing apparatus of example 7, wherein the counter payload comprises a 56-bit counter value and an 8-bit operation type.

Example 9 includes the computing apparatus of any of examples 1-6, wherein lazy incrementing the counter comprises issuing a fast doorbell write operation.

Example 10 includes the computing apparatus of any of examples 1-6, wherein lazy incrementing the counter comprises write combining with fencing.

Example 11 includes the computing apparatus of example 1, wherein lazy incrementing the counter comprises accessing a local writeback counter with write combining.

Example 12 includes one or more tangible, non-transitory storage mediums including logic for providing a lazy increment counter engine to: receive a stimulus to update the counter; and lazy increment the counter comprising issuing a weakly-ordered increment directive to the pointer.

Example 13 includes the one or more tangible, non-transitory storage mediums of example 12, wherein the counter memory location is mapped to a counter buffer of a counter device.

Example 14 includes the one or more tangible, non-transitory storage mediums of example 12, wherein the weakly-ordered increment directive is a cache bypass write directive.

Example 15 includes the one or more tangible, non-transitory storage mediums of example 14, further comprising a write combining buffer (WCB).

Example 16 includes the one or more tangible, non-transitory storage mediums of example 15, wherein the write directive is a write combining (WC) directive via the WCB.

Example 17 includes the one or more tangible, non-transitory storage mediums of example 14, wherein the write directive is an uncacheable (UC) write.

Example 18 includes the one or more tangible, non-transitory storage mediums of any of examples 12-17, wherein the write directive is to write a 64-bit counter payload to the counter memory location.

Example 19 includes the one or more tangible, non-transitory storage mediums of example 18, wherein the counter payload comprises a 56-bit counter value and an 8-bit operation type.

Example 20 includes the one or more tangible, non-transitory storage mediums of any of examples 12-17, wherein lazy incrementing the counter comprises issuing a fast doorbell write operation.

Example 21 includes the one or more tangible, non-transitory storage mediums of any of examples 12-17, wherein lazy incrementing the counter comprises write combining with fencing.

Example 22 includes the one or more tangible, non-transitory storage mediums of example 12, wherein lazy incrementing the counter comprises accessing a local writeback counter with write combining.

Example 23 includes a computer-implemented method of lazy incrementing a counter, comprising: receiving a stimulus to update the counter; and lazy incrementing the counter comprising issuing a weakly-ordered increment directive to the pointer.

Example 24 includes the method of example 23, wherein the counter memory location is mapped to a counter buffer of a counter device.

Example 25 includes the method of example 23, wherein the weakly-ordered increment directive is a cache bypass write directive.

Example 26 includes the method of example 23, further comprising a write combining buffer (WCB).

Example 27 includes the method of example 26, wherein the write directive is a write combining (WC) directive via the WCB.

Example 28 includes the method of example 25, wherein the write directive is an uncacheable (UC) write.

Example 29 includes the method of any of examples 23-28, wherein the write directive is to write an 64-bit counter payload to the counter memory location.

Example 30 includes the method of example 29, wherein the counter payload comprises a 56-bit counter value and an 8-bit operation type.

Example 31 includes the method of any of examples 23-28, wherein lazy incrementing the counter comprises issuing a fast doorbell write operation.

Example 32 includes the method of any of examples 23-28, wherein lazy incrementing the counter comprises write combining with fencing.

Example 33 includes the method of example 23, wherein lazy incrementing the counter comprises accessing a local writeback counter with write combining.

Example 34 includes an apparatus comprising means for performing the method of any of examples 23-33.

Example 35 includes the apparatus of example 34, wherein the means for performing the method comprise a processor and a memory.

Example 36 includes the apparatus of example 35, wherein the memory comprises machine-readable instructions, that when executed cause the apparatus to perform the method of any of examples 23-33.

Example 37 includes the apparatus of any of examples 34-36, wherein the apparatus is a computing system.

Example 38 includes at least one computer readable medium comprising instructions that, when executed, implement a method or realize an apparatus as illustrated in any of examples 23-38.

Example 39 includes a counter apparatus, comprising: a data interface to communicatively couple the counter apparatus to a processor; and a lazy increment engine to: receive an increment message from the processor; and update a counter, comprising performing a weakly-ordered write.

Example 40 includes the counter apparatus of example 39, wherein the counter is a local counter.

Example 41 includes the counter apparatus of example 40, wherein the local counter is mapped to a memory address space of the processor.

Example 42 includes the counter apparatus of example 39, wherein the counter is mapped to a main memory location.

Example 43 includes the counter apparatus of example 39, wherein the weakly-ordered write is a cache bypass write.

Example 44 includes the counter apparatus of example 39, wherein the increment message is a 64-bit message.

Example 45 includes the counter apparatus of example 39, wherein the counter message comprises a first bit range comprising a type field, and a second bit range comprising a payload.

Example 46 includes the counter apparatus of example 45, wherein the type field comprises eight bits, and the payload comprises 56 bits.

What is claimed is:

1. A computing apparatus, comprising:
   a processor;
   instructions to allocate a pointer to a counter memory location; and
   an engine to:
      receive a stimulus to update a counter; and
      increment the counter comprising issuing a non-cache coherent increment directive to the pointer.

2. The computing apparatus of claim 1, wherein the counter memory location is mapped to a counter buffer of a counter device.

3. The computing apparatus of claim 1, wherein the non-cache coherent increment directive is a cache bypass write directive.

4. The computing apparatus of claim 3, further comprising a write combining buffer (WCB).

5. The computing apparatus of claim 4, wherein the write directive is a write combining (WC) directive via the WCB.

6. The computing apparatus of claim 3, wherein the write directive is an uncacheable (UC) write.

7. The computing apparatus of claim 3, wherein the write directive is to write a 64-bit counter payload to the counter memory location.

8. The computing apparatus of claim 7, wherein the counter payload comprises a 56-bit counter value and an 8-bit operation type.

9. The computing apparatus of claim 1, wherein lazy incrementing the counter comprises issuing a fast doorbell write operation.

10. The computing apparatus of claim 1, wherein lazy incrementing the counter comprises write combining with fencing.

11. The computing apparatus of claim 1, wherein lazy incrementing the counter comprises a local writeback counter with write combining.

12. One or more tangible, non-transitory storage mediums including instructions for providing an engine to:

receive a stimulus to update a counter; and increment the counter comprising issuing a non-cache coherent increment directive to a pointer.

13. The one or more tangible, non-transitory storage mediums of claim 12, wherein a counter memory location is mapped to a counter buffer of a counter device.

14. The one or more tangible, non-transitory storage mediums of claim 13, wherein the non-cache coherent increment directive is a cache bypass write directive.

15. The one or more tangible, non-transitory storage mediums of claim 14, further comprising a write combining buffer (WCB).

16. The one or more tangible, non-transitory storage mediums of claim 15, wherein the write directive is a write combining (WC) directive via the WCB.

17. The one or more tangible, non-transitory storage mediums of claim 14, wherein the write directive is an uncacheable (UC) write.

18. The one or more tangible, non-transitory storage mediums of claim 14, wherein the write directive is to write a 64-bit counter payload to the counter memory location.

19. The one or more tangible, non-transitory storage mediums of claim 18, wherein the counter payload comprises a 56-bit counter value and an 8-bit operation type.

20. The one or more tangible, non-transitory storage mediums of claim 12, wherein lazy incrementing the counter comprises issuing a fast doorbell write operation.

21. The one or more tangible, non-transitory storage mediums of claim 12, wherein lazy incrementing the counter comprises write combining with fencing.

22. The one or more tangible, non-transitory storage mediums of claim 12, wherein lazy incrementing the counter comprises a local writeback counter with write combining.

23. A computer-implemented method of lazy incrementing a counter, comprising:

allocating a pointer to a counter memory location;

receiving a stimulus to update the counter; and incrementing the counter comprising issuing a non-cache coherent increment directive to the pointer.

24. The method of claim 23, wherein the counter memory location is mapped to a counter buffer of a counter device.

25. The method of claim 23, wherein the non-cache coherent increment directive is a cache bypass write directive.

* * * * *